UNITED STATES PATENT OFFICE.

FRANK FORSTER RENWICK, OF BRENTWOOD, AND OLAF BLOCH, OF LONDON, ENGLAND, ASSIGNORS TO ILFORD LIMITED, OF ILFORD, ENGLAND.

COLOR-SENSITIZED PHOTOGRAPHIC MATERIAL.

1,320,176.      Specification of Letters Patent.      Patented Oct. 28, 1919.

No Drawing.      Application filed November 21, 1918. Serial No. 263,591.

*To all whom it may concern:*

Be it known that we, FRANK FORSTER RENWICK, a subject of the King of England, and OLAF BLOCH, a subject of the King of England, residing at Brentwood, in Essex, England, and London, England, respectively, have invented certain new and useful Improvements in Color-Sensitized Photographic Materials, of which the following is a specification.

This invention is for improvements in or relating to color-sensitized photographic materials, and has for its object to provide material which shall have either a different or a greater color-sensitiveness than has heretofore been obtainable.

According to this invention, the color-sensitized material comprises a light-sensitive emulsion containing a dye of the auramin or iminodiphenyl methane class (*i. e.* substitution derivatives of benzophenoneimid).

The chemical formula for the principal member of the class is

$$(N(CH_3)_2C_6H_4)_2=C=NH,$$

and it is to be understood that one or both of the two dimethlyamido groups may be replaced by hydrogen or organic radicals, and that any one or more of the remaining nine hydrogen atoms in this typical compound may be replaced by another atom or group such as chlorin, the amido group, the ethyl group and others to form other dyes of this class.

It has before been proposed to use auramin in the emulsion of an orthochromatic plate in sufficient quantity to, and solely for the purpose of reducing the action of blue light on the plate in the same way as tartrazin and other yellow dyes are used in making self-screened or non-filter orthochromatic plates, but auramin has no apparent color sensitizing effect when used with dyes of the eosin group, or with any other color-sensitizing dye known at the time when it was thus proposed to employ auramin.

Heretofore it has not been known that dyes of this class, of which auramin is the chief representative, had any color-sensitizing effect. This is perhaps due to the sensitizing action of this dye (auramin) occurring in the blue region of the spectrum.

We have found that if auramin is applied to a chlorid emulsion it makes it strongly sensitive to the blue region of the spectrum and that it also has a just perceptible sensitizing effect on the ordinary fast bromid emulsions.

The dye may be used in about the ordinary proportions for color-sensitizing, which is only from one-tenth to one-fortieth of the quantities used for screening purposes. For example, if a plate is to be treated by the bathing process, it is immersed for 3 or 4 minutes in a solution of 1 grm. of auramin, or another dye of the same class, in 50,000 ccs. of water.

If desired, part of the water may be replaced by alcohol and a few drops of ammonia may be added per 1000 ccs, of the bath, these variations being already known in connection with the immersion of photographic materials for color-sensitizing.

If the dye is added to the melted emulsion, it may be added in the proportion of .005–.025 grams per liter of emulsion.

A color-sensitized material comprising a light-sensitive emulsion containing a dye of the auramin or iminodiphenyl methane class together with a dye of the isocyanin class, is disclosed in our co-pending application, Serial No. 263,592.

What we claim as our invention and desire to secure by Letters Patent is:—

A color-sensitized material comprising a light-sensitive emulsion containing a dye of the auramin or iminodiphenyl methane class as defined as the color-sensitizer.

In testimony whereof we have signed our names to this specification in the presence of two subscribing witnesses.

FRANK FORSTER RENWICK.
    OLAF BLOCH.

Witnesses:
    A. M. HAYWARD,
    HARRY W. RIEDYL.